J. W. FITZ GERALD.
AUTOMATIC BELT TENSIONING MEANS FOR DRIVE MECHANISM.
APPLICATION FILED JAN. 18, 1917.
1,254,320.
Patented Jan. 22, 1918.
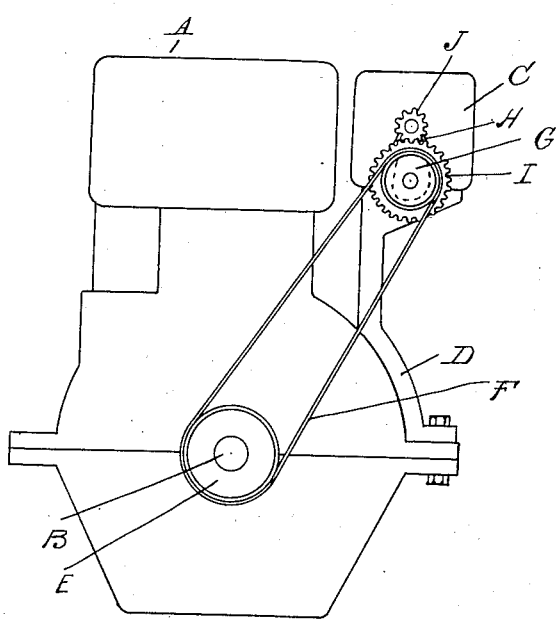
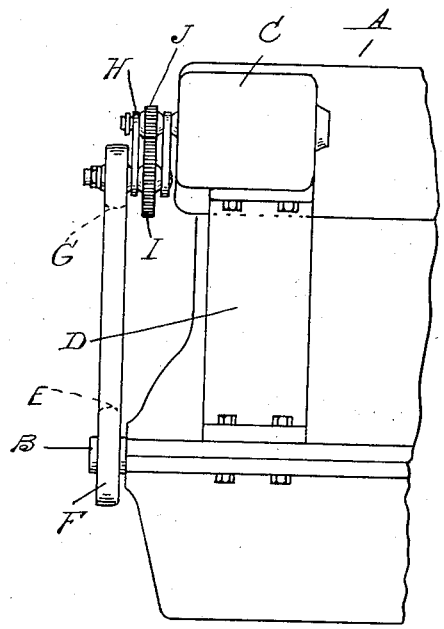
John W. Fitzgerald, Inventor
By Whittemore Hulbert & Whittemore
Attorneys

UNITED STATES PATENT OFFICE.

JOHN W. FITZ GERALD, OF DETROIT, MICHIGAN.

AUTOMATIC BELT-TENSIONING MEANS FOR DRIVE MECHANISM.

1,254,320.

Specification of Letters Patent.

Patented Jan. 22, 1918.

Application filed January 18, 1917. Serial No. 143,162.

*To all whom it may concern:*

Be it known that I, JOHN W. FITZ GERALD, a citizen of the United States of America, residing at Detroit, in the county of Wayne and State of Michigan, have invented certain new and useful Improvements in Automatic Belt-Tensioning Means for Drive Mechanism, of which the following is a specification, reference being had therein to the accompanying drawings.

The invention relates to driving mechanism employing friction belts and operating under conditions of varying speed and load. It is the object of the invention to provide automatic means for maintaining on the belt a tension proportional to the load so as to prevent slippage without overstraining.

In the drawings:

Figure 1 is an elevation showing my improved belt tightening mechanism as applied to the driving of an electric generator from the engine of the motor vehicle; and Fig. 2 is an elevation at right angles to Fig. 1.

A is the engine, B the crank shaft and C an electric generator mounted upon a bracket D secured to the engine casing. E is a pulley on the crank shaft and F is a friction belt engaging said pulley and transmitting motion from the same to the generator.

To maintain the proper tension upon the belt F the connection between the latter and the generator C is of such a character that an increase in load will increase the tension. As specifically shown this is accomplished by engaging the belt F with the pulley G which is mounted on a swinging link H and which drives a gear wheel I, in mesh with the pinion J on the generator shaft. The arrangement is such that when there is a load for retarding the rotation of the generator shaft and pinion J, the gear wheel I will tend to travel around said pinion in a planetary movement, this tendency placing an increased tension upon the belt F. Also where there is an acceleration in speed, resistance due to inertia will have the same tendency to increase the tension on the belt. On the other hand electric generators which are used to operate under conditions of varying speed with a substantially constant output of current will automatically decrease the load as the speed increases and this will re-act upon the belt by relieving the tension.

With the construction as described the tension upon the belt may be adjusted to the minimum required for preventing slipping under normal working conditions and where the load is decreased or increased there will be an automatic adjustment correspondingly decreasing or increasing the tension.

Any suitable construction of self-regulating generator may be used for maintaining a constant output under varying speeds and the utility of my invention is not in anyway dependent upon the specific character of this mechanism. There is, however, a general coöperation between my mechanism and a driven mechanism in which the load is decreased as the speed is increased.

What I claim as my invention is:

1. The combination with a drive mechanism and a driven mechanism for maintaining a substantially constant load under variable speed, of a friction belt transmission therebetween, and means for maintaining a tension on said belt proportional to the torque and without regard to the speed.

2. The combination with a drive mechanism and an electric generator constructed to maintain a substantially constant output at varying speeds, of a friction belt transmission therebetween, and means for maintaining a tension on said belt proportional to the torque and without regard to speed.

3. The combination with a drive mechanism and an electric generator constructed to maintain a substantially constant output upon variations in speed of the rotor, of a friction belt transmission between said drive mechanism and rotor, and means actuated by the varying torque between the rotor and stator for proportionately varying the tension upon the belt whereby there may be a decreased tension upon increased speed.

4. The combination with a drive mechanism and an electric generator constructed to maintain a substantially constant output with varying speed of the rotor, of a friction belt transmission between said drive mechanism and rotor, and means operated by the magnetic torque of said rotor for proportionately tensioning said belt.

In testimony whereof I affix my signature.

JOHN W. FITZ GERALD.